(No Model.) 3 Sheets—Sheet 2.
A. FAY & J. McNAB.
BICYCLE.
No. 567,824. Patented Sept. 15, 1896.
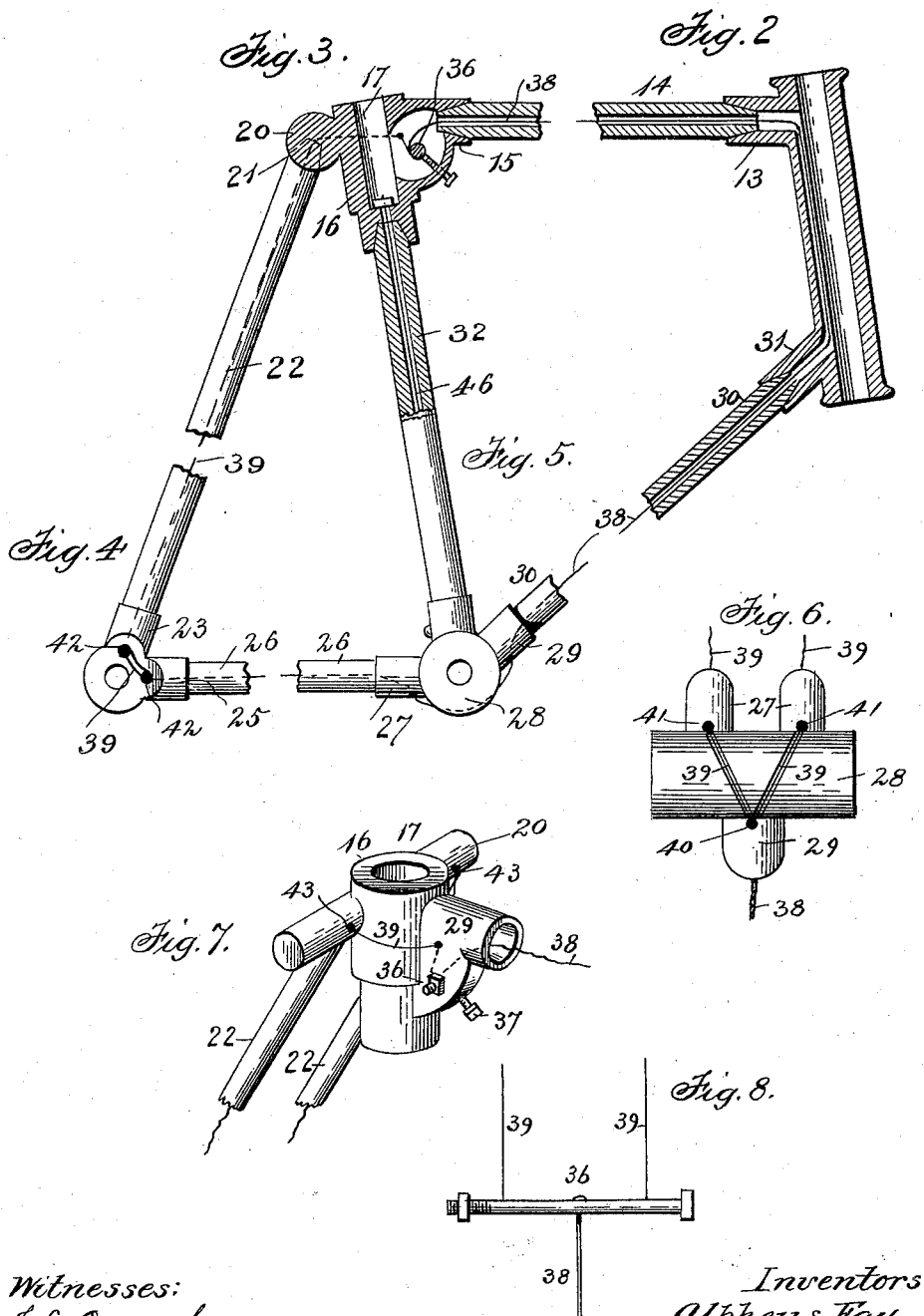

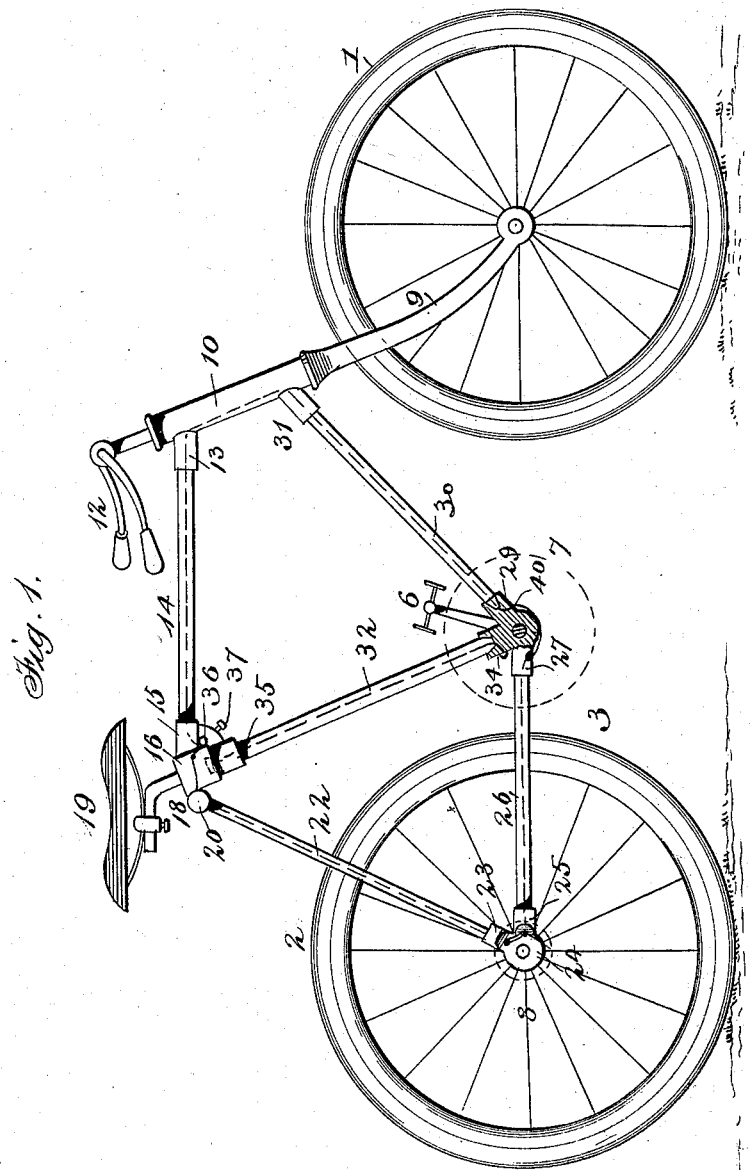

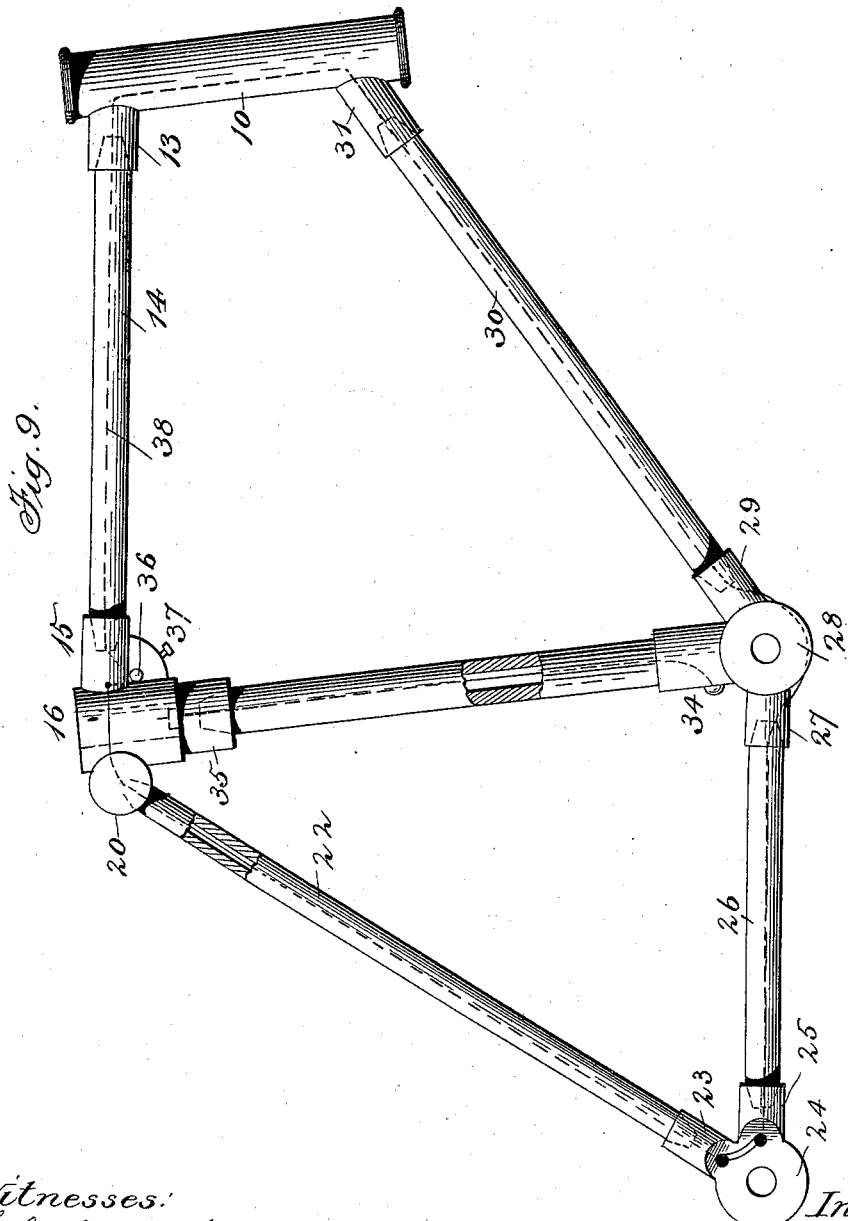

UNITED STATES PATENT OFFICE.

ALPHEUS FAY, OF CINCINNATI, OHIO, AND JOHN McNAB, OF LOUISVILLE, KENTUCKY.

BICYCLE.

SPECIFICATION forming part of Letters Patent No. 567,824, dated September 15, 1896.

Application filed January 4, 1896. Serial No. 574,292. (No model.)

*To all whom it may concern:*

Be it known that we, ALPHEUS FAY, of Cincinnati, in the county of Hamilton and State of Ohio, and JOHN McNAB, of Louisville, in the county of Jefferson and State of Kentucky, have invented certain new and useful Improvements in Bicycles; and we do hereby declare that the following is a full, clear, and exact description of the invention, which will enable others skilled in the art to which it appertains to make and use the same, reference being had to the accompanying drawings, which form a part of this specification.

Our invention relates to bicycles; and its object is to provide an improved construction of frame thereof which shall be exceedingly strong, yet very light, and which can be readily made taut if it should sag or become loose.

As is well understood by those familiar with the manufacture and use of bicycles, it happens that from long and continued use the joints of the frame become loose, causing the same to sag and rattle and rendering it necessary to tighten the various joints, which is a very tedious and laborious operation.

The object of our invention is to provide improved means for tightening the frame, whereby all the joints may be tightened at a single operation and whereby, also, when so tightened, there will be less liability of the frame sagging, and at the same time it will be greatly strengthened.

The invention consists, essentially, in running a continuous wire through the bicycle-frame and connecting it with a rotatable bolt or pin, by rotating which the wire may be tightened when loose and all the joints of the frame be correspondingly tightened.

It also consists in certain novel features of construction and combination of parts, all of which will be hereinafter fully described and claimed.

In the accompanying drawings, Figure 1 is a side elevation of a bicycle constructed in accordance with our invention. Figs. 2 and 3 are detail sectional views of the front and rear forks, respectively, and connections. Fig. 4 is a detail elevation of the coupling through which the rear axle passes. Fig. 5 is a similar view of the crank or pedal shaft coupling. Fig. 6 is a view looking from the under side of coupling shown in Fig. 5. Fig. 7 is a detail perspective view of the coupling which receives the seat support or standard. Fig. 8 is a detail view of the rotatable tightening bolt or pin. Fig. 9 is a side elevation of the frame.

In the said drawings the reference-numeral 1 designates the front wheel, 2 the rear wheel, 3 the sprocket-chain, 4 the cranks, 6 the pedals, and 7 and 8 the sprocket-wheels, of a bicycle, which may be of any ordinary or suitable construction.

The numeral 9 designates the front fork, to which the front wheel is journaled, the upper end of which passes through a metal tube 10 and is provided with the usual handle or steering bars 12. The tube 10 near the upper end is formed with a socket 13, the end of which is made flaring to receive the front end of the horizontal hollow wooden bar 14, the ends of which are cut away to fit in the socket 13 and a similar socket 15, formed with a coupling 16. This coupling is formed with a recess 17 to receive the standard or support 18 of a seat 19. It is also formed with oppositely-extending lugs 20, having flaring apertures therein, into which are inserted the reduced ends 21 of the rear fork or inclined bars 22, which consist of wooden tubes and which pass down alongside the rear wheel and engage with flaring sockets 23 of a coupling 24, through which the rear axle passes. This coupling is also provided with flaring sockets 25, with which engage the forwardly-extending hollow wooden bars 26, which fit in corresponding sockets 27, formed with the pedal or crank shaft coupling 28. This coupling is also formed with a flaring socket 29, with which engages a hollow wooden bar 30, the other end of which engages with a similar socket 31, formed at the lower end of the metal tube 10.

The numeral 32 designates a hollow wooden bar, the ends of which are reduced and fit in flaring sockets 34 and 35, formed with the couplings 28 and 16, respectively. It will thus be seen that the frame is hollow and is composed of the wooden tubes, the front metal tube, and the couplings and sockets.

Passing transversely through the socket 16 is a headed rotatable pin or bolt 36, screw-threaded at the opposite end and provided with a set-screw 37. Secured to this bolt or pin is a wire 38, which extends through the wooden bar 14, tube 10, wooden bar 30, to coupling 28, where it is split or divided, forming two wires 39, and passes through holes 40 in the socket 29. The two wires thus formed pass around the lower part of coupling 28 and enter socket 27 through holes 41, from whence they pass through bar 26 to socket 25, through holes 42 therein to sockets 23, up through the rear forks 22, to and through holes 43 in the lugs 20, and through holes 45 in the sockets 15, where they are secured to the bolt-pin 36.

The numeral 46 designates a wire secured to the lower end of bar 32, the upper end of which passes through socket 35 and is screw-threaded and provided with a securing-nut 47.

From the above it will be seen that should the frame become loose it can be easily tightened by loosening the set-screw of the pin or bolt 36 and rotating the latter, when the parts will be drawn taut and the joint will be made rigid. The tension of the wires will also strengthen the frame.

Having thus fully described our invention, what we claim is—

1. In a bicycle, the combination with the front metal tube, having flaring sockets, the hollow wooden bars, the couplings having flaring sockets with which said wooden bars engage and intersecting openings at an angle thereto, and the seat-support having flaring sockets and intersecting openings, of the rotatable pin journaled to said support, the set-screw, and the wires passing through said tube and bars and through the openings in the couplings around the sides thereof, substantially as described.

2. In a bicycle, the combination with the frame, comprising the front metal tube formed with flaring sockets, the seat-supporting socket having lugs formed with apertures and with flaring openings or sockets, the rear axle-coupling having flaring sockets with holes therein, the crank-shaft coupling having flaring sockets with holes therein, and the hollow wooden bars, having reduced ends, fitting in said sockets, of the rotatable bolt or pin, the wire secured thereto passing through said tube to the crank-shaft coupling and then divided forming two wires passing through the holes in the sockets and through the rear wooden bars between the crank-shaft and seat-support couplings and secured to the said bolt or pin, substantially as described.

In testimony that we claim the foregoing as our own we have hereunto affixed our signatures in presence of two witnesses.

ALPHEUS FAY.
JOHN McNAB.

Witnesses:
EDGAR SLACK,
CHARLES B. AVEY.